United States Patent [19]

Elmaleh

[11] Patent Number: 5,589,064

[45] Date of Patent: Dec. 31, 1996

[54] APPARATUS FOR LIQUID SOLID SEPARATION OF LIQUID EFFLUENTS OR WASTEWATER

[76] Inventor: Samuel Elmaleh, 21 Rue De L'Abbe' Camozy, 34830 Clapiers, France

[21] Appl. No.: 327,939

[22] Filed: Oct. 24, 1994

[51] Int. Cl.⁶ .................................................. C02F 1/52
[52] U.S. Cl. ........................ 210/206; 210/96.1; 210/207; 210/521
[58] Field of Search .................................. 210/96.1, 199, 210/201, 206, 209, 519, 521, 522, 802, 207

[56] References Cited

U.S. PATENT DOCUMENTS

| | | | |
|---|---|---|---|
| 3,250,394 | 5/1966 | Clark | 210/519 |
| 3,635,346 | 1/1972 | Zuckerman et al. | 210/521 |
| 4,136,012 | 1/1979 | Louboutin et al. | 210/521 |
| 4,783,255 | 11/1988 | Bogusch | 210/522 |
| 4,816,157 | 3/1989 | Jennelle | 210/521 |
| 4,855,061 | 8/1989 | Martin | 210/96.1 |
| 4,871,459 | 10/1989 | Titoff | 210/521 |
| 4,883,603 | 11/1989 | Roggenstein et al. | 210/521 |
| 5,075,001 | 12/1991 | Taylor | 210/519 |
| 5,277,806 | 1/1994 | Kuntz | 210/521 |
| 5,433,862 | 7/1995 | Batson | 210/802 |

Primary Examiner—Peter A. Hruskoci
Assistant Examiner—Theodore M. Green
Attorney, Agent, or Firm—Lackenbach Siegel Marzullo Aronson & Greenspan, P.C.

[57] ABSTRACT

A method and apparatus for liquid solid separation of liquid effluents or wastewater containing pollutant particles in a suspension. A vessel defining a reactor for receiving and containing a flow of the liquid effluent or wastewater has an inverted lower distribution cone defining a coagulation zone into which the flow is injected toward the apex of the cone at the bottom of the reactor to provoke an intense mixing of the polluted or contaminated liquid with a water-soluble chemical alkaline agent added to the injected flow externally of the reactor as required to control the pH of the injected liquid. The reactor has a wider volume above and contiguous with the lower coagulation zone and is dimensioned for effectively defining a flocculation zone, and an upper part of the reactor defines a turbulence-free volume above the flocculation zone and contiguous therewith for settling of flocculant comprising the coalesced contaminant particles and the separation of solids and liquids. The water-soluble chemical alkaline-agent is added intermittently to the flow externally of the reactor as required to control the pH of the liquid. At least one probe sensor is provided to intermittently instruct an external source of the water-soluble chemical the amount of alkaline-agent to be added to the inlet flow being injected as a function of the pH detected by the pH sensor.

8 Claims, 4 Drawing Sheets

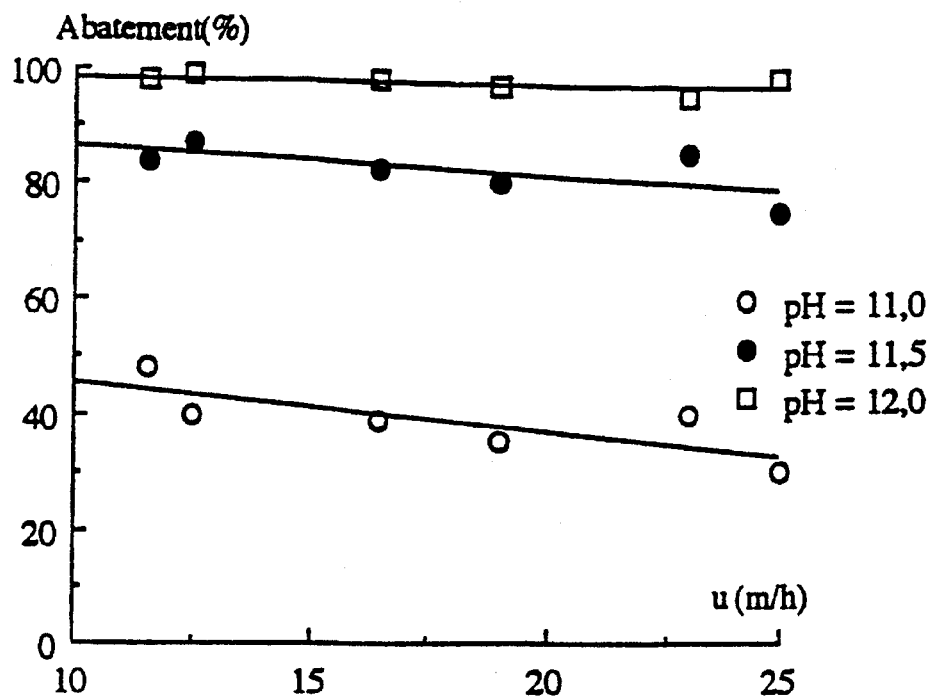
FIG.4, Ci=180 mg/l, NaOH.
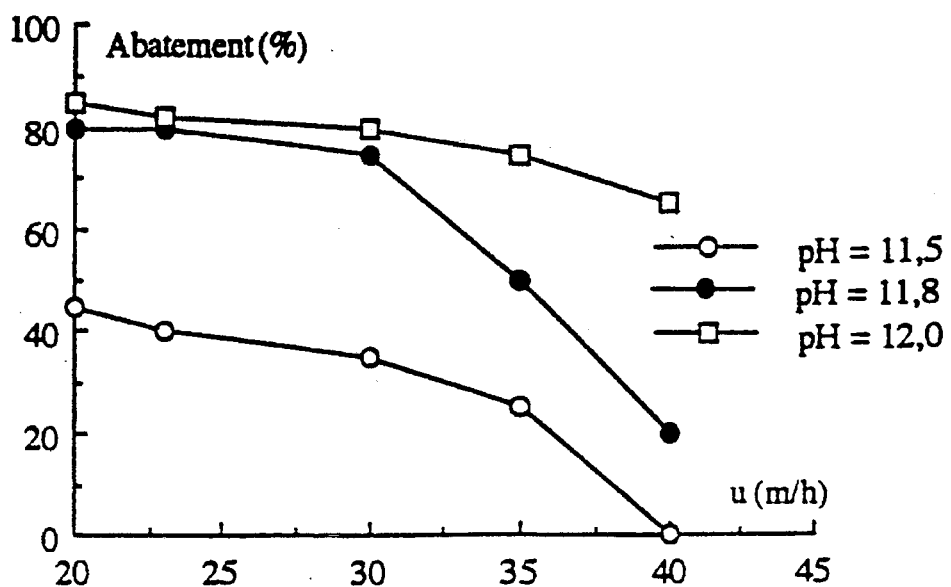
FIG.5, Ci = 60 mg/l, lime.

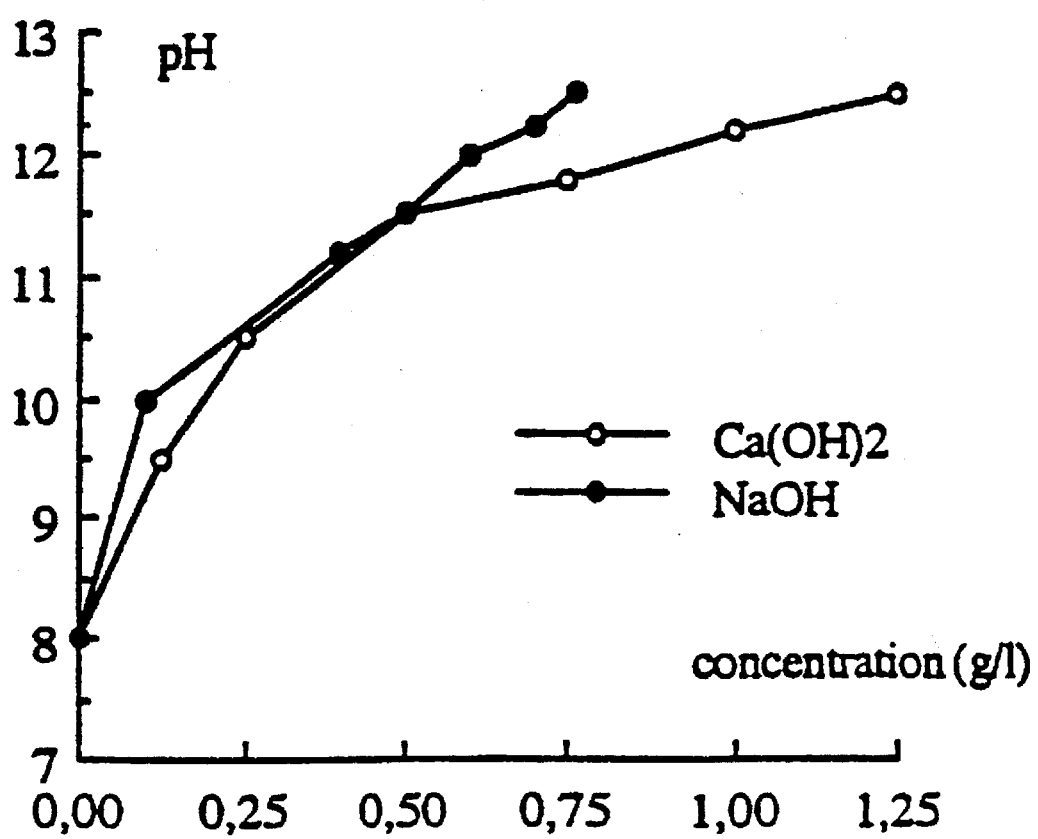
FIG.6, pH vs alcaline agent concentration.

APPARATUS FOR LIQUID SOLID SEPARATION OF LIQUID EFFLUENTS OR WASTEWATER

This invention relates generally to the purification of polluted and wastewater and more particularly to a method and apparatus for solid separation of liquid effluents and wastewater containing pollutant particles in a suspension.

BACKGROUND OF THE INVENTION

The nations of the world have become conscious of the need to require their cities and industries to stop contaminating their sources of water. Industry has realized that wastewater from different industrial processes should be purified and reused not only to avoid penalties but also to improve the economics of their processes. Cities and towns have become conscious of the need to avoid pollution of rivers, bays and other bodies of water and underground water resources. It is an increasingly common practice for communities to develop oxidation ponds for liquid effluent from which the effluent is taken and treated.

Different known methods and systems have been developed for contaminated water treatment. The known systems make use of chemical treatment of the water for agglomeration of suspended particles. The systems adjust the pH value of the wastewater by use of chemicals. Where seawater is readily available, an inexpensive source of magnesium is provided for removal of a wide range of impurities from wastewater has been reported by George M. Anjoub, Sang-Ill Lee and Ben Koofwan.

The basic principle of the known purification systems is the enhancement of flocculation of suspended particles in the effluent or wastewater being treated. The systems are generally complex and do not obtain completely purified potable water.

A principal objection of the invention is to provide an apparatus in which a novel vessel is a simple reactor for purifying water preferably continuously.

SUMMARY OF THE INVENTION

The present invention makes use of the principle of flocculation of particles in the removal of contaminant primary particles which are in suspension by use of an apparatus having a vessel defining a novel, bed-free reactor having stationary or fixed surfaces and which has an object to combine three functions: coagulation of the particles in a suspension which requires intensive mixing of a chemical with the suspension being treated; secondly, flocculation, which requires smooth agitation; and then settling of the flocculent mass, which requires an absence of turbulence.

The reactor according to the invention achieves these requirements by provision thereon of an inverted lower distribution cone into which liquid effluent or wastewater, to which has been added a base chemical externally of the reactor, is injected under pressure through a pipe toward the apex or bottom of the inverted cone disposed at the bottom of the reactor.

The liquid effluent is ejected from the pipe toward the bottom of the cone and provokes an intense mixing of the chemical and water in the vicinity of the cone bottom, the apex. The distribution cone defines a lower volume of the reactor which is a coagulation zone.

The reactor has a wider volume above and contiguous with the coagulation zone dimensioned to receive upwardly flowing liquid from the coagulation zone and defines a flocculation zone.

An upper part of the reactor contiguous with the flocculation zone defines a volume free of turbulence which receives upwardly rising effluent or wastewater from the flocculation zone and forms a settling and separation zone from settling of flocculent comprising the coalesced contaminant particles and provides for the separation of the solids as sludge at the bottom of the zone and clarified liquid at the top of the zone.

BRIEF DESCRIPTION OF THE DRAWINGS

The diagrammatic views appended hereto illustrate the apparatus, according to the invention, and the method carded out thereby of treating, clarifying and purifying effluent or wastewater containing pollutant primary particles in suspension and in which:

FIG. 4, is a graph illustrating total solids abatement, as a function of pH values and upflow superficial velocity, in the reactor, according to the invention;

FIG. 5, is a graph illustrating percentage solids abatement illustrating how it is limited by upflow superficial velocity; and FIG. 6, is a graph illustrating the treating chemical, alkaline requirements to reach pH values.

DESCRIPTION OF THE PREFERRED EMBODIMENTS

Figure 1:
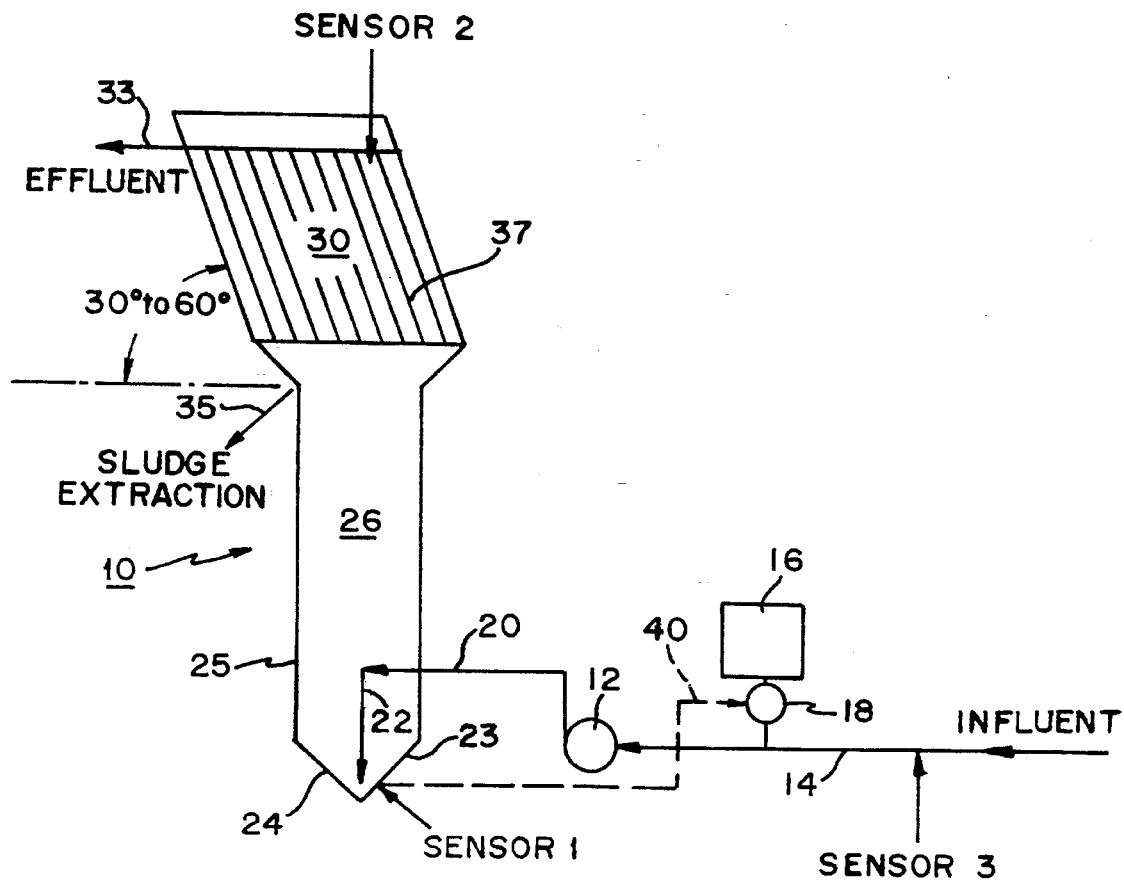
FIG. 1, is a diagrammatic elevation view of the apparatus according to the invention.
Figure 2:
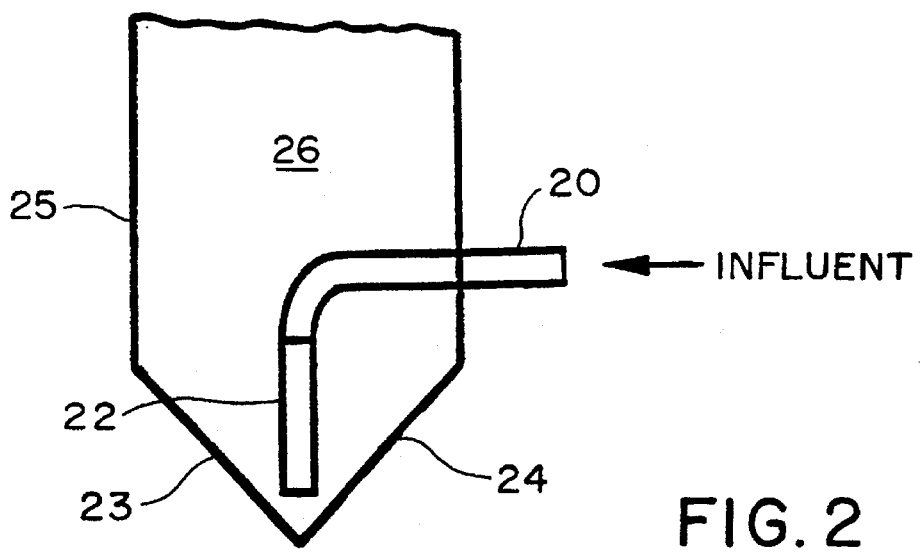
FIG. 2, is a diagrammatic elevation section view, on an enlarged scale, of a vessel forming a part of the reactor of the apparatus shown in FIG. 1.
Figure 3:
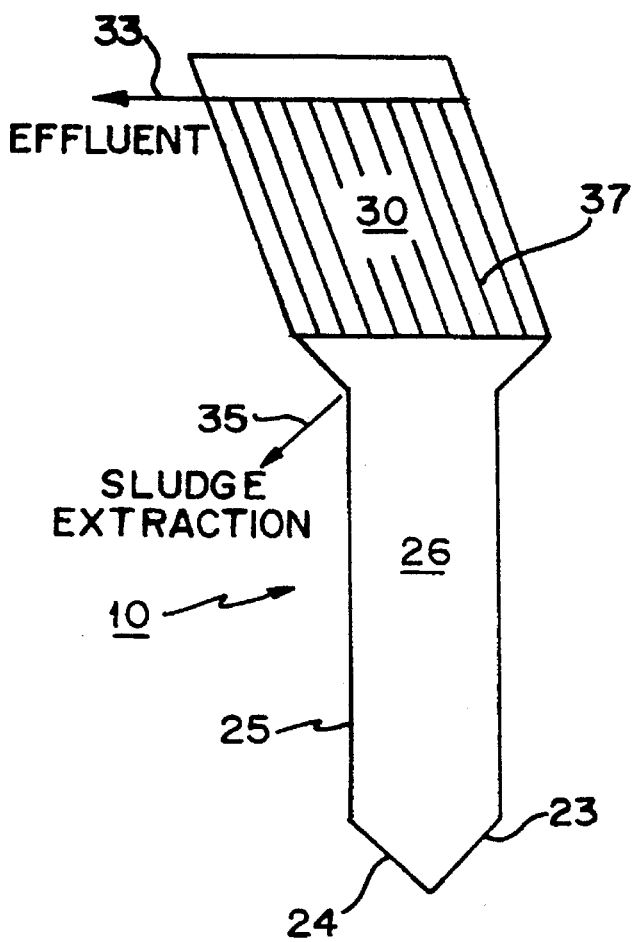
FIG. 3, is a diagrammatic elevation section view of the reactor illustrated in FIGS. 1 and 2.

The apparatus according to the invention for treating and purifying wastewater or effluents of different types is illustrated in FIGS. 1–3. The apparatus comprises a vessel which is a reactor 10 into which a main pump 12 pumps effluent or wastewater taken through a suction or intake pipe 14 from an oxidation or stabilization pond or a wastewater source, not shown. A treating base chemical, for example, lime, is intermittently supplied from a source 16 by a pump 18 to the intake or suction line 14 for delivery of an effluent and chemical mixture flow to the reactor 10 through a discharge pipe or line 20 of the main pump 12. The discharge pipe 20 has a water ejection section or device 22 oriented toward an apex of an inverted cone 24 which forms the bottom part or volume of the reactor 10.

The water ejection device 22 is spaced from the bottom of the reactor and water ejection into the cone provokes an intense mixing of the chemical mixture in the vicinity of the cone bottom. The diverging stationary walls 23 of the cone develop an upward flow of the mixture so that the cone 24 functions as a distribution cone and defines an effective coagulation zone due to the intense mixing.

In the wider cylindrical volume 25 of the reactor, the cross section is designed large enough to eliminate any turbulence, and this forms a wider volume above and contiguous with the coagulation zone formed by the cone. The wider part of the reactor is dimensioned to receive the upwardly moving liquid without turbulence, and a flocculation zone 26 is formed thereby.

It should be understood that the strong mixing requirement of the effluent, chemical and flocculant can be met in some instances by the turbulent transport through the pipes 14, 20 between the flocculant injection point and the reactor.

The uppermost part of the reactor is a sedimentation or clarification zone or settler 30. This zone is free of turbulence so that this zone 30 forms a settling and separation zone for settling of flocculent comprising the coalesced contaminant particles. Clarified liquid effluent is removed from the apparatus at the top of the settler 30 through a line or pipe 33, and sludge extraction from the apparatus is through a line 35 at the bottom of the settler 30.

The settler can have inclined surfaces 37 formed therein to facilitate deposition of the solids as shown in FIG. 3. Nevertheless, in case the effluent is from an upgraded stabilization pond, the inclined surfaces are not necessarily required.

The unit 10 can be fed the liquid effluent by any type of main pump, centrifugal or volumetric. When possible, the unit can be fed by gravity, too. The chemical from the source 16 must be injected by a displacement pump 18.

The pressure in the novel reactor results from the water height only. The pressure drop along the reactor is not significant.

The suspension pH is a function of the base concentration injected from the chemical source into the reactor 10. This concentration is calculated by the following relationship.

$$C = \frac{qc}{Q}$$

where,

C=concentration in the reactor;

c=concentration of the injected base suspension;

q=injection flow rate; and

Q=flow rate through the reactor.

The size of the particles removed is small so that the apparatus is highly efficient in particle removal. Any macrocolloidal or colloidal particle contained in the inlet flow will be coprecipitated in the reactor. The minimum particle size is 0.05 μm. Above 1.2 μm the particles are considered settleable.

Provision is made in the apparatus for positioning of a pH probe in the reactor. The alkaline agent is, for example, a lime which is a weak base whose solubility depends on several parameters which vary all along the unit from the inlet to the outlet. The water being treated contains suspended matter which can obturate the pH sensor or probe whose indication becomes erratic.

It has been found that different locations of the sensor are possible. A first position corresponds to the lower part of the reactor unit in the distribution cone (FIG. 1, sensor 1). The sensor is connected through a feedback loop 40, as shown in FIG. 1, to the lime supply pump 18 to control the supply of lime to the reactor as a function of the pH detected. It has been found that the pH senor at this position reacts rapidly to pH variation, but its obturation is also rapid.

A second possible location for the pH sensor is in the upper part of the reactor unit near the outlet (FIG. 1, sensor 2). The risk of obturation of the sensor is less, but the response is affected by a large time constant which hampers the in-line pH regulation.

A solution possible for good pH regulation is derivation of a filtered fraction of the flow near the inlet through a measurement chamber, not shown. However, measurement at this point is hampered by the incomplete disassociation of the base or lime.

An economical solution of pH regulation by in-line control of the intermittent supply of lime is to measure the effluent pH (FIG. 1, sensor 3). Knowing the inlet suspended solids concentration, it is possible then to calculate the required base or lime concentration.

The total solids abatement depends on the pH and the upflow superficial velocity (FIGS. 4 and 5). In conformity with runs effected in a batch or continuous reactor operation, the abatement is significant between pH 11 and 12 whatever the alkaline agent is: sodium hydroxide (FIG. 4) or lime (FIG. 5).

The solids abatement is limited by the upflow superficial velocity. The breakpoint in FIG. 5 corresponds to the maximum settling velocity in the sedimentation zone. At pH near 12 the flocs are heavier than at pH 11, which explains that the breakpoint effect is less sensitive.

FIG. 6 shows the alkaline agent concentration required to reach a pH value. If a stabilization pond effluent contains 150 mg/l suspended solids, the final effluent must contain less than 30 mg/l and 80% abatement is enough, which means that a concentration of 0.6 g/l of lime or 0.5 g/l of NaOH is required. This in fact is the only way to monitor the unit. These figures allow calculating of the alkaline mass flow ram.

The lime solubility depends on pH: $[Ca^{++}][OH^-]=K$, where K is the solubility constant depending on temperature. Therefore, a lime suspension injected into the flocculator does not induce a constant measurement by a pH probe. The pH value varies in a wide range, and the probe gives only an indication, which sometimes is completely erroneous. Moreover, continuous lime injection is not required: the bed sludge is able to liberate $OH^-$ ions. It is possible then to minimize the lime flow rate.

The best results are obtained by maintaining periods of injection and stopping injection for periods of the same length: for example, two minutes of injection, two minutes of stopping the injection. The stopping period must not exceed five minutes. This procedure allows significant saving of alkaline agent consumption.

Those skilled in the art will readily understand that the novel apparatus uses much less energy and chemicals for carrying out clarification of the water being treated. Furthermore, the clarified water taken from the reactor 10 can be purified in a known manner.

What I claim:

1. Apparatus for treating liquid effluent or wastewater containing pollutant particles in a suspension comprising:

a vessel defining a reactor for receiving and containing a flow of a liquid effluent or wastewater containing pollutant particles in a suspension and having a chemical therein for assisting agglomeration of said particles;

said reactor having a lower volume therein defining a coagulation zone comprising an injector in said lower volume of said reactor for delivering said flow in a given direction in the said lower volume;

said reactor lower volume defining a coagulation zone comprising convergent internal reaction surfaces having a fixed configuration for effecting intense mixing of said flow received in said coagulation zone and flowing said flow upwardly in said lower volume of said reactor;

said injector in said lower volume of said reactor coactive with said internal reaction surfaces disposed for delivering said flow against the reaction surfaces to develop counterflows for effectively causing said intense mixing by said reaction surfaces in the lower volume of said reactor defining said coagulation zone;

said reactor having a volume above and contiguous with the coagulation zone into which the intensely mixed effluent or wastewater and chemical therein rises upwardly from said coagulation zone, and dimensioned for effectively allowing the primary particles to coalesce therein and effective flocculation to take place so that a flocculation zone is defined in the reactor above the coagulation zone;

said reactor having at an upper part contiguous with the flocculation zone a volume tree or turbulence receiving effluent or wastewater from the flocculation zone and defining a settling and separation zone for settling of flocculant comprising the coalesced contaminant particles and separation of solids and liquid; and means for discharging the clarified water and solids from said settling and separation zone.

2. Apparatus according to claim 1, in which said reaction surfaces converge downwardly in said vessel.

3. Apparatus according to claim 1, in which said reaction surfaces define substantially a conical configuration.

4. Apparatus according to claim 1, in which said reactor is free of bed material including a fluidized bed.

5. Apparatus according to claim 1, in which said reaction surfaces converge downwardly and diverge upwardly in a lowermost volume of said vessel.

6. Apparatus for treating a liquid effluent or wastewater having a primary particles suspension of contaminants therein comprising:

a vessel defining a reactor for receiving a flow of said effluent or wastewater to be clarified and containing a chemical for adjusting the pH;

said reactor having a lower volume defining a coagulation zone comprising convergent internal reaction surfaces having a fixed configuration for effecting intense mixing of said flow received in said coagulation zone and flowing said flow upwardly in said lower volume of said reactor;

an injector in said lower volume of said reactor coactive with said internal reaction surfaces disposed for delivering said flow against the reaction surfaces to develop counterflows for effectively causing said intense mixing by said reaction surfaces in the lower volume of said reactor defining said coagulation zone;

said reactor having a volume above and contiguous with the coagulation zone into which the intensely mixed effluent or wastewater or chemical therein rises upwardly from said coagulation zone, and dimensioned for effectively allowing the primary particles to coalesce therein and effective flocculation to take place so that a flocculation zone is defined in the reactor above the coagulation zone;

said reactor having as an upper part thereof contiguous with the flocculation zone a volume free of turbulence receiving effluent or wastewater from the flocculation zone and for having surfaces therein inclined from the vertical for developing laminar flow defining a settling and separation zone for settling of flocculant comprising the coalesced contaminant particles and separation of solids and liquid; and means for discharging separately the clarified water and solids from said settling and separation zone.

7. Apparatus according to claim 6, including means for injecting said flow into said reactor intermittently.

8. Apparatus according to claim 7, in which said means for injecting said flow is operable for injecting said flow during periods of injection in the order of two minutes and periods of stopping injuection for periods not exceeding five minutes.

\* \* \* \* \*